UNITED STATES PATENT OFFICE.

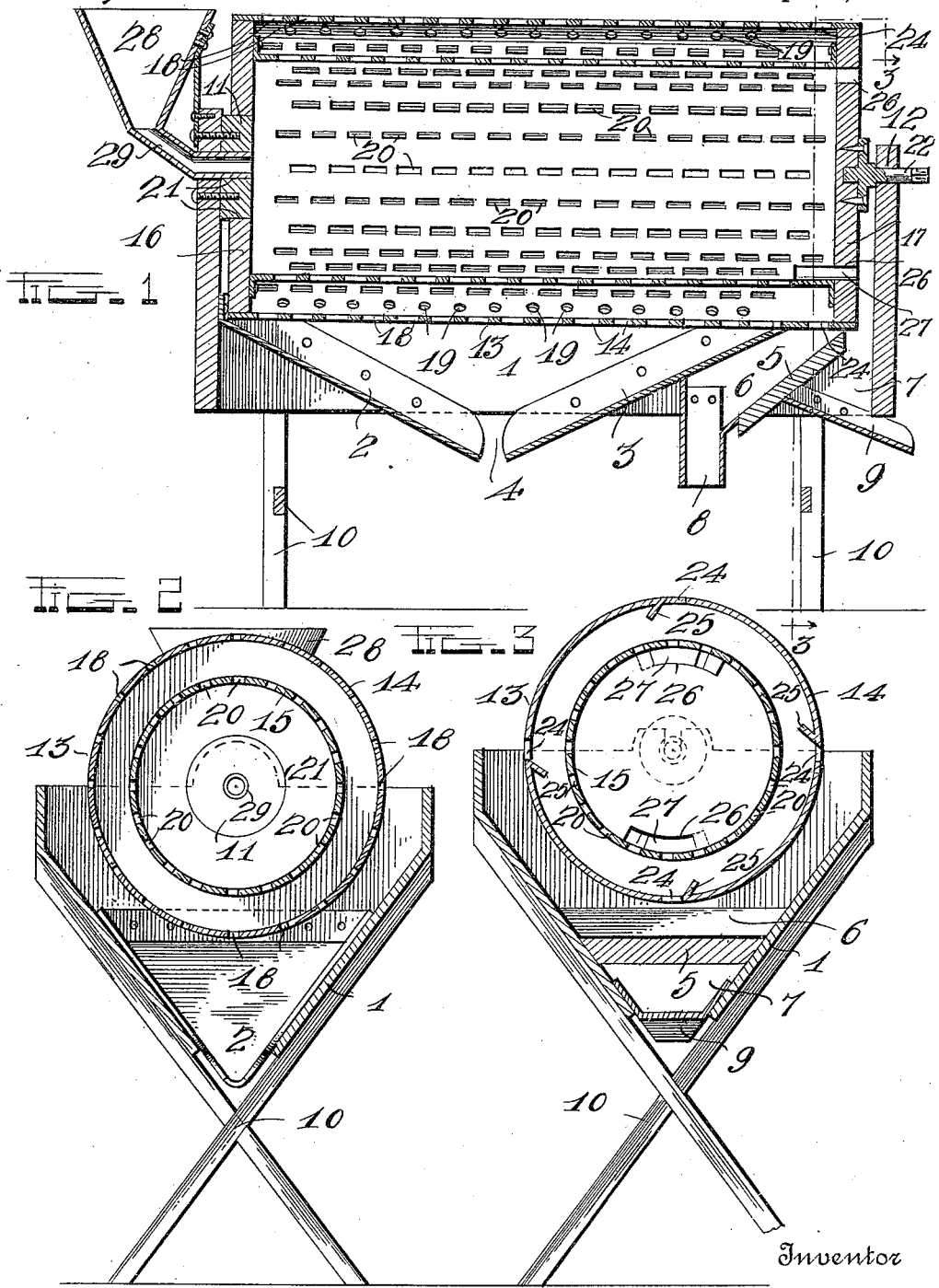

ORRAL E. CRAIG, OF ISABEL, ILLINOIS.

ROTARY CORN-GRADER.

990,341.

Specification of Letters Patent.

Patented Apr. 25, 1911.

Application filed December 29, 1910. Serial No. 599,927.

*To all whom it may concern:*

Be it known that I, ORRAL E. CRAIG, a citizen of the United States, residing at Isabel, in the county of Edgar and State of Illinois, have invented certain new and useful Improvements in Rotary Corn-Graders; and I do declare the following to be a full, clear, and exact description of the invention, such as will enable others skilled in the art to which it appertains to make and use the same.

This invention relates to improvements in rotary graders or separators for corn, seeds or the like.

The object of the invention is to provide a separator or grader of this character in which the grain, seeds or the like fed therethrough will be separated into different grades according to the size of the same.

Another object is to provide a grader of the class described having an improved construction and arrangement of seed receiving trough whereby the different sizes of seeds separated by the grading mechanism are received and conducted to separate receptacles tacles provided to receive the same.

With these and other objects in view, the invention consists of certain novel features of construction, combination and arrangement of parts as will be more fully described and particularly pointed out in the appended claim.

In the accompanying drawings: Figure 1 is a vertical longitudinal section of a grader constructed in accordance with the invention; Fig. 2 is a central vertical cross section; Fig. 3 is a similar view on the line 3—3 of Fig. 1.

Referring more particularly to the drawings, 1 denotes the body portion or trough of my improved grader, said trough having its sides inclined inwardly toward their lower ends as shown. In the bottom of the trough are arranged inclined deflecting plates 2 and 3, the plate 2 of which is arranged in one end of the trough and the plate 3 of which extends from a point near the opposite end as shown. The inner lower ends of the plates terminate a short distance from each other and form a narrow discharge passage 4 through which the seed passing through the main portion of the separating mechanism is discharged. The space in the end of the trough between the outer end of the deflecting plate 3 is divided by an inclined deflecting plate 5 into two discharge passages 6 and 7. Connected with the lower end of the discharge passage 6 is a discharge tube 8 while with the passage 7 is connected a discharge chute 9 said tube and chute, as well as the discharge passage 4 being connected with suitable receptacles provided to receive the grain or seed discharged therethrough. The trough 1 is supported upon suitable legs 10 and preferably has the discharge end slightly lower than the inlet end thereof.

In one end of the trough is arranged a tubular journal or bearing 11 while in the opposite end is arranged a bearing 12. Revolubly mounted in the trough and extending from one end to the other thereof is a double separating cylinder or screen 13 comprising an outer shell or cylinder 14 and an inner shell or cylinder 15. The shells 14 and 15 are secured at their opposite ends in heads 16 and 17 whereby said ends of the cylinders or shells are closed. In the outer cylinder are formed longitudinal series of oblong slots 18 between which are arranged rows of circular openings 19, said openings 19 being disposed opposite or in line with the spaces between the slots. The slots and circular openings in the cylinder terminate a short distance from the discharge end of the cylinder as shown. In the inner cylinder are formed parallel rows of longitudinally disposed discharge slots 20, said slots being arranged so that the slots of one row are opposite to the spaces between the slots of the adjacent rows. The slots 20 of the inner cylinder extend throughout the entire length of the same or from one head to the other of the cylinder, and said slots 20 are somewhat larger than the openings in the outer cylinder. In the head 16 is formed a centrally disposed circular bearing passage 21 which receives the projecting inner end of the tubular journal 11 in the end of the trough whereby this end of the screen is revolubly supported. On the opposite head 17 is secured a short stub shaft 22 which is revolubly engaged with the bearing 12 in the adjacent end of the trough. The shaft 22 projects a suitable distance beyond the end of the trough and is squared to receive a crank not shown or other operating means whereby the cylinder is revolved in the trough.

In the discharge end of the outer cylinder adjacent to the inner side of the head 17 are formed a series of discharge passages 24 which communicate with the discharge passage 6 in the bottom of the trough whereby the grain or seed which passes through the slots of the inner cylinder but are too large to pass through the openings of the outer cylinder are discharged. At one end of the passages 24 are formed inwardly projecting angular deflecting flanges 25 which prevent the grain or corn from crowding over and clogging up the passages. In the head 17 at diametrically opposite points and adjacent to the inner side of this end of the inner cylinder are formed discharge passages 26 through which the corn or grain too large to pass through the openings of the inner cylinder is discharged. The grain or seed discharged through the passages thus falls into the discharge passage 7 in the bottom of the hopper and is conducted therefrom through the chute 9 to the receptacle provided to receive the same. At one end of each of the passages 26 is formed an inclined deflecting flange 27 which serves to prevent the grain in the cylinder 15 from crowding and clogging up these passages. The corn, grain or other seed which are small enough to pass through the openings in both cylinders will fall onto the deflecting plates 2 and 3 which direct the same to the passage 4 through which this small grain or seed is discharged into a suitable receptacle provided to receive the same.

Arranged at one end of the trough is a feed hopper 28 said hopper having a discharge spout 29 the lower end of which projects into or communicates with the tubular journal 11 on which the adjacent end of the screen is mounted. By thus arranging the trough the grain or seed therefrom is fed through said tubular journal into the inner cylinder as shown. By constructing and arranging the rotary screen 13 of the grader as herein shown and described it will be seen that the seed or grain passing through the same will be separated or graded into three sizes and the separated grain conducted by the various chutes or discharge passages provided therefor to the separate receptacles provided to receive the same.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim is:

In a separator of the character described, a trough, seed deflecting plates arranged in the bottom of said trough whereby a series of discharge passages are formed therein, grain conducting chutes connected with said passages, a separating screen revolubly mounted in said trough, said screen comprising inner and outer cylinders having perforations of different size and said outer cylinder having formed therein near one end a series of discharge passages whereby the seed or grain too large to pass through the perforations thereof are discharged therefrom, heads to close the opposite ends of said cylinders, one of said heads having formed therein discharge passages communicating with the inner cylinder whereby the grain or seed too large to pass through the perforations of said inner cylinder are discharged therefrom, seed deflecting flanges formed on the discharge passages of said inner and outer cylinders whereby the grain or seed is prevented from clogging said passages, and means whereby the grain or seed is fed to the inner cylinder.

In testimony whereof I have hereunto set my hand in presence of two subscribing witnesses.

ORRAL E. CRAIG.

Witnesses:
G. F. ENGLISH,
W. A. BUTCHER.